United States Patent

[11] 3,572,472

| [72] | Inventor | Edward R. Black<br>1261 Normandy Way, Apt. 2, Santa Clara, Calif. 95050 |
|---|---|---|
| [21] | Appl. No. | 817,772 |
| [22] | Filed | Apr. 21, 1969 |
| [45] | Patented | Mar. 30, 1971 |

[54] EMERGENCY BRAKE SYSTEM FOR A VEHICLE
1 Claim, 3 Drawing Figs.

[52] U.S. Cl. ................................................ 188/170, 188/265, 303/89
[51] Int. Cl. ...................................................... F16d 69/00
[50] Field of Search ........................................ 188/170, 265; 303/89

[56] References Cited
UNITED STATES PATENTS
1,006,239 10/1911 Leftwich et al. ............... 303/89
1,792,895 2/1931 Cowlishaw ..................... 188/170X
2,099,453 11/1937 Searle ............................ 303/89
2,121,366 6/1938 Robinson ....................... 303/89

FOREIGN PATENTS
398,470 12/1931 Great Britain ................. 188/170

Primary Examiner—George E. A. Halvosa
Attorney—Edward A. Robinson

ABSTRACT: A parking brake for a motor vehicle is actuated by reduced pressure or vacuum from the engine intake manifold which will compress a spring to release the brakes. When the vacuum is shut off the spring will expand and will apply the brakes to the vehicle. When the spring is compressed and the brakes are released, a pawl will engage and secure the spring in compression to prevent inadvertent application of the brakes if the manifold vacuum is reduced.

Patented March 30, 1971          3,572,472
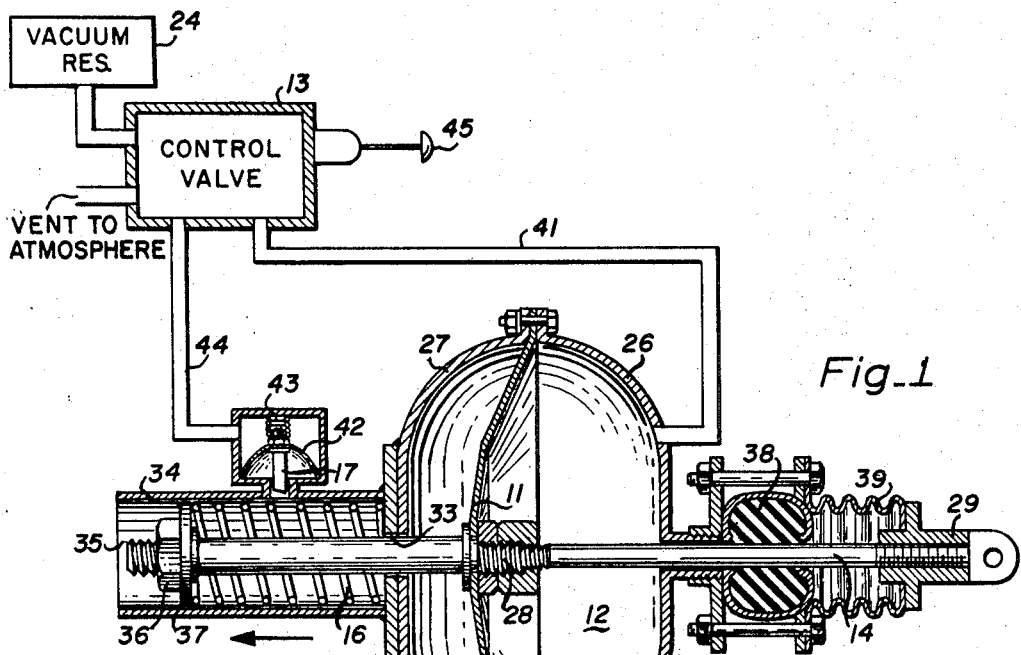
Fig_1
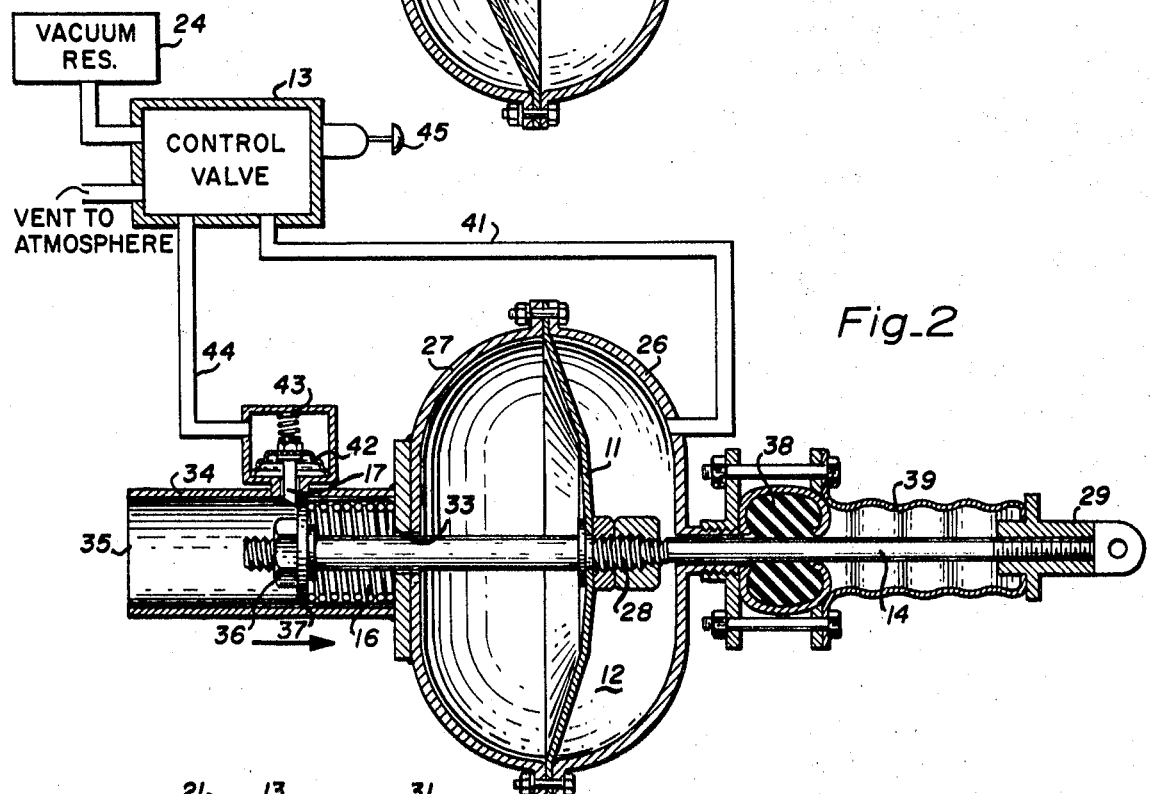
Fig_2
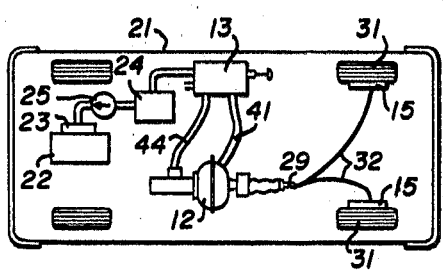
Fig_3
INVENTOR
EDWARD R. BLACK
BY
    *Edward A. Robinson*
ATTORNEY

EMERGENCY BRAKE SYSTEM FOR A VEHICLE

BACKGROUND OF THE INVENTION

Motor vehicles which are equipped with hydraulic brakes must be provided with an independent mechanical system for applying a parking or emergency brake. The parking brake cannot depend upon hydraulic pressure for operation, because the hydraulic pressure will leak away and will dissipate during any extended period of time while the vehicle is parked. Present day vehicles use drum-type brakes on the rear wheels with a dual arrangement for expanding the brakeshoes against the drums to apply the brakes. The brake shoes may be expanded by a hydraulic cylinder which is a part of the hydraulic braking system; and the brake shoes may be independently expanded by a mechanical linkage coupled to a hand lever or special foot pedal for setting the parking brakes.

Heretofore, automobiles and other motor vehicles have been equipped with power brakes wherein a brake pedal controls valves for directing vacuum from the engine intake manifold to a master hydraulic cylinder. To provide a reliable source of reduced pressure or vacuum, a reservoir tank may be used which is coupled to the intake manifold by a check valve. Thus a vacuum supply will remain available for a limited time after the engine has stalled or has been turned off.

It is an object of this invention to provide a power actuated system for applying parking brakes for a vehicle; and more particularly, it is an object to provide a parking brake system which is actuated by vacuum pressure from the engine manifold, but which will remain indefinitely in either a "set" condition or in a "released" condition without continued application of vacuum pressure.

It is another object of this invention to provide an emergency braking system for a vehicle which may be actuated by vacuum pressure from the engine manifold, and where the brakes may be "set" even after a failure of the engine vacuum; and more particularly, it is an object to provide such a braking system wherein the brakes when "set" will be applied gradually so that a moving vehicle need not experience an abrupt braking action that might tend to throw the vehicle out of control.

DESCRIPTION OF THE DRAWING

Other objects and advantages of this invention will become apparent upon consideration of the following description taken in connection with the accompanying drawing showing an exemplary embodiment of this invention. The views of the drawing are as follows:

FIGS. 1 and 2 are similar sectional views of a brake actuation vacuum chamber of this invention together with a schematic representation of the hydraulic connections to a control valve—the parts shown in FIG. 1 are positioned to "set" the brakes, and the parts shown in FIG. 2 are positioned to "release" the brakes; and FIG. 3 is a schematic representation of a motor vehicle with the parts of the braking system shown therein.

SUMMARY OF THE INVENTION

According to this invention, the emergency or parking brakes are mechanically actuated from the movement of a diaphragm 11 in a vacuum chamber 12. When a control valve 13 passes air from the vacuum chamber 12 to reduce the pressure on the right side (as shown in FIGS. 1 and 2) of the diaphragm 11, the atmospheric air vented to the left side of the chamber will move the diaphragm to the right, as shown in FIG. 2. When the diaphragm is moved to the right (FIG. 2) a central actuation rod 14 moves to the right (1) to release the brakes 15, and (2) to compress a spring 16. A pawl 17 secures the spring in a compressed condition and the brakes in a released condition even though the vacuum pressure may be subsequently reduced. When the control valve 13 is changed, (1) the pawl 17 is retracted to release the spring 16, and (2) the chamber 12 is vented to atmospheric pressure, whereupon the spring 16 will expand and both the actuation rod 14 and the diaphragm 11 will move to the left as shown in FIG. 1 to set the brakes.

DESCRIPTION OF THE PREFERRED EMBODIMENT

As shown in FIG. 3, a motor vehicle 21 has an engine 22 with an intake manifold 23. A vacuum reservoir tank 24 is pneumatically coupled to pass air to the intake manifold 23 via a check valve 25. Therefore it may be appreciated that the reservoir tank 24 will store a vacuum from the engine manifold, and because of the check valve 25, the vacuum will remain in the reservoir 24 for a limited time after the engine has stopped. The control valve 13 may pass air from the vacuum chamber 12 to the reservoir or vacuum source 24, such that the chamber 12 to the right of the diaphragm 11 (as shown in FIGS. 1 and 2) will be evacuated to a condition of reduced pressure.

The diaphragm 11 is clamped between two parts of a housing 26 and 27 and is rigidly held about the periphery thereof. However, the center of the diaphragm may flex to the left or to the right as shown respectively in FIG. 1 and FIG. 2. The actuation rod is formed of two rods secured together by a threaded assembly 28 with the center of the diaphragm 11 clamped thereto. Therefore, the assembled actuation rod 14 becomes a rigid member extending through the compression spring on one end, and through the vacuum chamber 12 to an eye connection 29 at the other end. Obviously the rod 14 and the center of the diaphragm 11 must move together while simultaneously compressing or expanding the spring 16 and translating the eye connection 29. As indicated in FIG. 3, the eye connection 29 is coupled to operate the brakes 15 of the vehicle's rear wheels 31 via a conventional mechanical linkage 32.

The vacuum chamber 12 is hermetically sealed to be airtight on the right side of the diaphragm only (as shown in FIGS. 2 and 3). The other side of the diaphragm is vented to the atmosphere through a loosely fitting hole 33 about the actuation rod 14 into a cylindrical spring housing 34 and out an open end 35 of the housing 34. The actuation rod 14 is fitted at one end with a nut 36 and a retaining washer 37 for holding the spring 16. None of this structure is an air seal, and therefore, the atmospheric air may pass through the spring housing 34 to vent the space to the left of the diaphragm 11 within the housing shell 27. The chamber 12 to the right of the diaphragm 11 is airtight, and the actuation rod 14 must pass through a packing gland 38. The packing gland 38 comprises a rubber body which is squeezed or compressed about the rod 14 to provide an airtight seal such that atmospheric air may not pass into the vacuum chamber 12 by a path along the actuation rod 14. A rubber bellows 39 is secured about the rod 14 from the packing gland 38 to the eye connection 29 for the purpose of keeping the rod 14 clean and free of dust. This becomes important since the rod must move into and out of the packing gland. If the rod were to carry any dirt or dust particles into the packing gland, the airtight seal would become impaired.

As shown in FIG. 1, the control valve is positioned to vent atmospheric air through a pneumatic line 41 to the chamber 12. In this condition both sides of the diaphragm 11 are at equal pressure (both vented to the atmosphere), and therefore the spring 16 is allowed to expand and to move the actuation rod to the left for setting the vehicle's brakes 15 via the linkage 32. When the control valve is changed, the air from the chamber 12 is evacuated to the source of vacuum 24. With the pressure reduced in the vacuum chamber 12, the diaphragm 11 and the actuation rod 14 are moved to the right as shown in FIG. 2. The movement to the right causes the spring to compress; and the retaining washer 37 will be locked by the pawl 17 to maintain the spring compressed.

Ordinarily, a continual vacuum or reduced pressure in the chamber 12 would be sufficient to maintain the spring in a compressed condition and to thereby maintain the brakes in a "released" condition. However, when the vehicle's engine is loaded heavily, as for example, when the vehicle is climbing a steep hill, the manifold vacuum may be considerably reduced. Under these conditions the pawl 17 will continue to retain the spring in a compressed condition and will continue to retain the brakes in a "released" condition even with a reduction in the vacuum pressure. Furthermore, it may for one reason or another become necessary to tow or to push the vehicle using another vehicle or other locomotive power. In such a case the vehicle's brakes could be maintained in the "released" condition by the pawl 17 without the engine running and with no source of vacuum.

When it is desired to again set the brakes, the control valve is changed to vent atmospheric air into the chamber 12 via the line 41 and simultaneously to apply a vacuum or reduced pressure to release the pawl 17. The pawl release arrangement includes a small diaphragm 42 which operates against the bias of a spring 43. The air may be evacuated from the diaphragm chamber via a pneumatic line 44.

As shown in FIGS. 1 and 2 the control valve 13 is changed from a first condition to a second condition by a plunger or button 45 which would ordinarily be mounted on the dashboard of a vehicle or in a position easily accessible to the driver. This plunger or button 45 is shown merely connect to operate the control valve 13. An alternative arrangement may be provided wherein the plunger 45 may also connect by a mechanical linkage such as a bowdin wire to directly operate the pawl 17. Thus the operation of the pawl to set the brakes of a vehicle could be independent of the vacuum system. As further alternative, the pawl 17 could be operated by electrical means using a solenoid to retract the pawl and to permit the spring to expand.

The use of vacuum power from an engine input manifold or from an auxiliary engine-driven pump provide this invention with certain advantages and features not obtainable from the mechanical linkage of prior art motor vehicles. First, the power to properly set the brakes is not obtained from hand or foot of the person driving the vehicle. Therefore, a lady driver may move the finger-operated control button 45 and cause the parking brake to be set as securely as if a more muscular man were to apply the brakes. Thus, the parking brakes will be set to a proper degree regardless of the character or strength of the driver of the vehicle.

A further advantage lies in the fact that once the vehicle is parked and the brakes are set, a child or incompetent person cannot later release the brakes to permit the vehicle to roll. Thus a child cannot inadvertently cause a parked vehicle to move and cause an accident. Ordinarily, the vehicle's engine must be started to create the required vacuum before the brakes may be released. This requires that a qualified driver with an ignition key be present to release the brakes.

Another advantage of the vacuum operated brakes resides in a gradual application of the brakes which is obtainable because of the restrictive passages for airflow into and out of the chamber 12. When the control valve is operated for setting the brakes, atmospheric air is vented through the valve 13 and the pneumatic line 41 into the chamber 12. The atmospheric air will flow through these somewhat restrictive passages to gradually increase the pressure of the chamber 12. Simultaneously, the diaphragm 11 will move to the left (FIG. 1) and the excess air to the left of the diaphragm will be expelled through the restrictive opening 33 and out through the spring housing 34. The restrictive passage for expelling this excess air will further contribute to the gradual application of the brakes in an emergency situation. Therefore, it may be appreciated that in an emergency road situation, the driver may pull the brake control button 45 and the brakes will be gradually actuated and set without any abrupt or jerky operation that could cause the driver to lose control of the vehicle. Obviously, the degree of restriction of the air passages may be optimized for a reasonable fast, but smooth, operation of the brakes.

As shown in FIGS. 1 and 2, the actuation rod 14 includes two sections which are fastened together at the joint 28 where the rod is secured to the center of the diaphragm 11. One section of the rod extends through the packing gland 38 to the eye connection 29 and the mechanical linkage 32 to the rear brakes 15; and the other section of the rod extends in the opposite direction to the nut 36 and washer 37 which constitutes a mechanical coupling to the spring 16. An alternative structure could provide that right-hand section of the rod 14 (as illustrated in FIGS. 1 and 2) could be eliminated; and that the eye connection could be mounted at the left-hand end of the rod beyond the spring connecting washer 37. This alternative arrangement would have the advantage of eliminating that section of the rod 14 which passes through the packing gland 39, and thereby eliminating the necessity for having a packing gland. Mechanical means could be devised for coupling the linkage 32 to the opposite end of the rod 14.

I claim:

1. Apparatus for setting and releasing emergency brakes of a vehicle, said apparatus comprising:
   a source of vacuum;
   a vacuum chamber including:
      a diaphragm which is clamped and held rigidly at the periphery thereof; and
      an actuation rod clamped to the center of the diaphragm and movable axially;
   a control valve pneumatically coupled between the source of vacuum and the vacuum chamber on a first side of said diaphragm for selectively venting the chamber to the atmosphere and evacuating the chamber;
   a first biasing spring mechanically coupled to the actuation rod for urging the actuation rod to a first position for setting the brakes;
   a pawl for securing the actuation rod in a second position for releasing the brakes;
   restrictive passages for passing air into and out of the vacuum chamber whereby the movement of the actuation rod will be smooth and gradual to set and release the brakes smoothly and gradually;
   said actuation rod being operable to release the brakes when vacuum is applied to the first side of the diaphragm in the vacuum chamber whereby air of atmospheric pressure will move the diaphragm and actuation rod to compress the spring; and
   a second bias spring coupled to the pawl for urging said pawl into engagement with said actuation rod when in said second position for maintaining the brakes in the released state, said control valve being coupled to the bias spring and to the pawl for releasing the pawl when the vacuum chamber on the first side of the diaphragm is vented to the atmosphere.